US012420237B2

United States Patent
Lee et al.

(10) Patent No.: US 12,420,237 B2
(45) Date of Patent: Sep. 23, 2025

(54) FILTER STRUCTURE HAVING FUNCTION OF SELECTIVELY COLLECTING WATER THROUGH OPPOSITE ENDS THEREOF AND FILTERING METHOD USING SAME

(71) Applicant: Toray Advanced Materials Korea Inc., Gyeongsangbuk-do (KR)

(72) Inventors: Jong Min Lee, Gyeongsangbuk-do (KR); Hee Kyung Lee, Gyeongsangbuk-do (KR)

(73) Assignee: Toray Advanced Materials Korea Inc., Gyeongsangbuk-do (KR)

( * ) Notice: Subject to any disclaimer, the term of this patent is extended or adjusted under 35 U.S.C. 154(b) by 645 days.

(21) Appl. No.: 17/761,564

(22) PCT Filed: Aug. 28, 2020

(86) PCT No.: PCT/KR2020/011523
§ 371 (c)(1),
(2) Date: Mar. 17, 2022

(87) PCT Pub. No.: WO2021/054642
PCT Pub. Date: Mar. 25, 2021

(65) Prior Publication Data
US 2022/0387936 A1    Dec. 8, 2022

(30) Foreign Application Priority Data

Sep. 17, 2019 (KR) .................. 10-2019-0114204

(51) Int. Cl.
*B01D 65/08* (2006.01)
*B01D 63/06* (2006.01)
(Continued)

(52) U.S. Cl.
CPC .......... *B01D 65/08* (2013.01); *B01D 63/065* (2013.01); *B01D 63/10* (2013.01); *C02F 1/44* (2013.01);
(Continued)

(58) Field of Classification Search
CPC ...... B01D 65/08; B01D 63/065; B01D 63/10; B01D 2311/04; B01D 2311/16;
(Continued)

(56) References Cited

U.S. PATENT DOCUMENTS

| | | |
|---|---|---|
| 5,425,877 A | 6/1995 | Knappe |
| 7,138,058 B2 | 11/2006 | Kurth et al. |

(Continued)

FOREIGN PATENT DOCUMENTS

| | | |
|---|---|---|
| CN | 1676203 | 10/2005 |
| CN | 102715170 | 10/2012 |

(Continued)

OTHER PUBLICATIONS

English language machine translation of KR101541654, 18 Pages, No Date.*

(Continued)

*Primary Examiner* — Pranav N Patel
(74) *Attorney, Agent, or Firm* — Morrison & Foerster LLP

(57) ABSTRACT

The present invention includes: a first sealing portion which has a first entry/exit selectively opened or closed by a first opening/closing valve and a second entry/exit selectively opened or closed by a second opening/closing valve and is configured to seal one end of a housing; a second sealing portion which has a third entry/exit selectively opened or closed by a third opening/closing valve and a fourth entry/exit selectively opened or closed by a fourth opening/closing valve, and is configured to seal the other end of the housing;

(Continued)

and a controller which is configured to control the supply of raw water through any one of the first entry/exit and the second entry/exit or control the supply of raw water through any one of the third entry/exit and the fourth entry/exit.

4 Claims, 4 Drawing Sheets

(51) Int. Cl.
  *B01D 63/10* (2006.01)
  *C02F 1/44* (2023.01)
(52) U.S. Cl.
  CPC ...... *B01D 2311/04* (2013.01); *B01D 2311/16* (2013.01); *B01D 2313/04* (2013.01); *B01D 2313/10* (2013.01); *B01D 2313/18* (2013.01); *B01D 2313/70* (2022.08); *B01D 2315/10* (2013.01); *B01D 2315/20* (2013.01); *C02F 2209/40* (2013.01); *C02F 2209/44* (2013.01)
(58) Field of Classification Search
  CPC ............ B01D 2313/04; B01D 2313/10; B01D 2313/18; B01D 2313/70; B01D 2315/10; B01D 2315/20; B01D 2313/08; B01D 2321/2083; B01D 69/04; B01D 65/02; B01D 65/06; B01D 65/003; B01D 2313/903; B01D 2313/12; B01D 2313/21; C02F 1/44; C02F 2209/40; C02F 2209/44; C02F 2201/004; C02F 2303/14; C02F 2303/16
  See application file for complete search history.

(56) References Cited

U.S. PATENT DOCUMENTS

| | | | |
|---|---|---|---|
| 8,506,807 | B2 | 8/2013 | Lee et al. |
| 2002/0027111 | A1* | 3/2002 | Ando ............... B01D 63/12 210/791 |
| 2002/0070158 | A1 | 6/2002 | Buecher et al. |
| 2008/0032719 | A1 | 2/2008 | Rosenberg |
| 2008/0185332 | A1 | 8/2008 | Niu et al. |
| 2010/0133183 | A1* | 6/2010 | Theron ............... C02F 1/44 210/333.01 |
| 2014/0083066 | A1 | 3/2014 | Bahukudumbi et al. |
| 2015/0014244 | A1 | 1/2015 | Shimura et al. |
| 2015/0144560 | A1* | 5/2015 | Taniguchi ............... C02F 1/44 210/321.74 |
| 2017/0144110 | A1 | 5/2017 | Shimura et al. |
| 2018/0133658 | A1 | 5/2018 | Seo et al. |
| 2018/0264411 | A1 | 9/2018 | Herron |
| 2019/0105208 | A1 | 4/2019 | Saevecke et al. |
| 2019/0209968 | A1* | 7/2019 | Hoz ............... C02F 1/008 |
| 2020/0040484 | A1 | 2/2020 | Watanabe et al. |
| 2021/0291119 | A1 | 9/2021 | Lee et al. |
| 2021/0322927 | A1 | 10/2021 | Cho et al. |
| 2022/0011630 | A1 | 1/2022 | Ko et al. |
| 2023/0008479 | A1 | 1/2023 | Park et al. |
| 2023/0347298 | A1 | 11/2023 | Lee |

FOREIGN PATENT DOCUMENTS

| | | |
|---|---|---|
| CN | 102177447 | 11/2013 |
| CN | 105694053 | 6/2016 |
| CN | 105771672 | 7/2016 |
| DE | 2020-15005969 | 11/2015 |
| EP | 1044718 | 10/2000 |
| JP | H 11-009921 | 1/1999 |
| JP | 2000-354743 | 12/2000 |
| JP | 2003-245530 | 9/2003 |
| JP | 2004-041870 | 2/2004 |
| JP | 2004-202409 | 7/2004 |
| JP | 2007-111606 | 5/2007 |
| JP | 2007-167783 | 7/2007 |
| JP | 4103131 | 6/2008 |
| JP | 2009-045595 | 3/2009 |
| JP | 2009-149573 | 7/2009 |
| JP | 2011-005455 | 1/2011 |
| JP | 2014-083515 | 5/2014 |
| JP | 2014-144441 | 8/2014 |
| JP | 2017-000939 | 1/2017 |
| JP | 2017-047417 | 3/2017 |
| JP | 2017-119932 | 7/2017 |
| JP | 2018-126706 | 8/2018 |
| KR | 10-0169484 | 10/1998 |
| KR | 10-0406735 | 8/2002 |
| KR | 10-2006-0011043 | 2/2006 |
| KR | 10-0865625 | 10/2008 |
| KR | 10-2009-0015087 | 2/2009 |
| KR | 10-2010-0008213 | 1/2010 |
| KR | 10-2010-0131423 | 12/2010 |
| KR | 10-2011-0109387 | 10/2011 |
| KR | 10-2012-0087416 | 8/2012 |
| KR | 10-2012-0098741 | 9/2012 |
| KR | 10-2012-0137890 | 12/2012 |
| KR | 10-2013-0000477 | 1/2013 |
| KR | 10-2014-0021270 | 2/2014 |
| KR | 10-2014-0046952 | 4/2014 |
| KR | 10-2014-0092306 | 7/2014 |
| KR | 10-2014-0138651 | 12/2014 |
| KR | 10-2015-0077062 | 7/2015 |
| KR | 10-2015-0079168 | 7/2015 |
| KR | 10-2015-0079170 | 7/2015 |
| KR | 10-2015-0083048 | 7/2015 |
| KR | 10-1541654 | 8/2015 |
| KR | 10-2016-0037584 | 4/2016 |
| KR | 10-2016-0081606 | 7/2016 |
| KR | 10-2017-0103541 | 9/2017 |
| KR | 10-2017-0112994 | 10/2017 |
| KR | 10-2017-0126693 | 11/2017 |
| KR | 10-2018-0111704 | 10/2018 |
| KR | 10-1966114 | 8/2019 |
| TW | I467249 | 1/2015 |
| WO | WO 2013/058986 | 4/2013 |
| WO | WO 2013/129610 | 9/2013 |

OTHER PUBLICATIONS

Royal Society of Chemistry, Antimony, Oct. 2019.
U.S. Appl. No. 17/761,146, filed Mar. 16, 2022, by Lee et al. (copy not provided).
U.S. Appl. No. 17/772,997, filed Apr. 28, 2022, by Park et al. (copy not provided).
Ramadan et al. "Review on Recent Applications of Antimicrobial Agents for Polyamide and Polypropylene." Al-Azhar Bulletin of Science (2012) 23.2-A: 1-28.
Density Periodic Table—Periodic Table Wallpaper (Year: 2017).

* cited by examiner (a)            (b)

FILTER STRUCTURE HAVING FUNCTION OF SELECTIVELY COLLECTING WATER THROUGH OPPOSITE ENDS THEREOF AND FILTERING METHOD USING SAME

CROSS REFERENCE TO RELATED APPLICATIONS

This application is a national stage application under 35 U.S.C. § 371 of International Application No. PCT/KR2020/011523, filed internationally on Aug. 28, 2020, which claims priority to and the benefit of Korean Patent Application No. 10-2019-0114204, filed Sep. 17, 2019. The contents of the above patent applications are incorporated by reference herein in their entireties for all purposes.

TECHNICAL FIELD

The present invention relates to a filter structure having a function of selectively collecting water through opposite ends thereof and a filtering method using the same, and more particularly, to a filter structure, which allows a filtration area of a separation membrane module, in which the level of contamination increases over usage time, to be evenly used throughout by selectively changing a simple fluid flow of the filter structure applied to a water purifier system, thus being capable of delaying the contamination of the separation membrane and extending the service life of the filter, and a filtering method using the same.

BACKGROUND ART

Generally, a water purifier is a device for removing harmful substances from introduced raw water such as tap water and supplying potable purified water, and a filter structure is used as a key component for removing harmful substances.

With the development of water treatment technologies for clean water and wastewater, a filtration method of the filter structure has been transformed from a conventional sand filtration method to a membrane filtration method using a separation membrane.

The separation membrane technology is a high-level technology for water treatment by separation and filtration that is for almost completely separating and removing substances to be treated present in treated water according to the pore size, pore distribution, and a membrane surface charge of the membrane.

The separation membrane, which is the key component, is classified into a microfiltration (MF) membrane, an ultrafiltration (UF) membrane, a nanofiltration (NF) membrane, and a reverse osmosis (RO) membrane according to the pore size, and its application range has been expanded to production of good-quality potable water and industrial water, treatment and reuse of wastewater, a cleaner production process relating to the development of zero liquid discharge system, and the like.

In line with the trend of serious water pollution, in recent years, the separation membrane technology has been established and become common as one of the key technologies attracting attention. In fact, ordinary people treat tap water, which has been purified and supplied, through a water purifier again and use the tap water as drinking water, and there is growing demand for technology development thereon.

Meanwhile, a water purifier system consists of a separation membrane module, pretreatment and posttreatment filters, a pump, a pipe, a tank, and other auxiliary devices, and the most important component among the components constituting the system is a filter structure, which is the separation membrane module.

Types of filter structure that have been commercialized include a plate-and-frame type, a hollow fiber type, a tubular type, and a spiral wound type, and research is mainly being carried out on the spiral wound type separation membrane module filter structure in which a separation membrane insertion density per unit area is high and which is capable of removing ions from water.

As illustrated in FIG. 1, a typical filter structure (1) includes a hollow cylindrical housing (10) and a separation membrane module (20) which has a water passage pipe (21) formed at the center of its body, and the separation membrane module (20) is accommodated inside the housing (10) so that an outer side end of a brine seal (13) comes into contact with an inner surface of the housing (10).

A raw water inlet (31) through which a raw water is introduced is disposed at one side of the housing (10), and a clean water outlet (35) through which a clean water, which is a produced water, is discharged and a concentrate outlet (34) through which a concentrate is discharged are disposed at the other side of the housing.

Accordingly, in a filtration process that uses the filter structure to purify the raw water, when a pressure is applied through the raw water inlet and the raw water is introduced in one direction, water purification is performed to filter foreign matter contained in the raw water through the separation membrane module embedded in the housing, the clean water, which is the water filtered by passing through the separation membrane module, is collected into the water passage pipe and discharged to the outside through the clean water outlet, and the concentrate remaining after the water purification is discharged to the outside through the concentrate outlet.

That is, in the filter structure, due to a phenomenon in which the raw water is concentrated by passing through the separation membrane module in one direction in a form in which the raw water is introduced in one direction through the raw water inlet at the left side in the drawing, membrane contamination starts from a portion adjacent and close to the concentrate outlet in the separation membrane module embedded in the housing, and contamination is accelerated over time from the portion where the membrane contamination starts.

Consequently, the filtration performance of the separation membrane module is reduced, and when the filtration performance is degraded by a certain level or more, the filter structure is replaced with a new one.

In particular, in the case of an industrial water purification system, a technology is disclosed for extending the service life of the separation membrane module by cleaning the separation membrane module by reversing a direction of entry of raw water using a high operation pressure to physically backwash and remove contaminants attached to a surface of the separation membrane or chemically removing contaminants remaining in the separation membrane module by chemical cleaning using an acidic or basic compound.

However, physical backwashing that requires a high operating pressure and chemical cleaning that requires chemical processing are structurally complex and difficult and are harmful to the human body, thus being difficult to apply to a household water purifier system. Accordingly, there is a need for technology development for reducing contamination of a separation membrane module of a filter structure for a household water purifier system.

DISCLOSURE

Technical Problem

The present invention is directed to providing a filter structure having a function of selectively collecting water through opposite ends thereof, which distributes contamination of a separation membrane module, which starts from and intensively occurs in a direction of a concentrate, evenly in opposite directions and allows a filtration area of the separation membrane module to be evenly used throughout by changing a structure so that directions in which a raw water is introduced and a clean water and the concentrate are discharged are selectively switched in opposite directions instead of being maintained in one direction, and a filtering method using the same.

Objectives to be achieved by the present invention are not limited to those mentioned above, and other unmentioned objectives should be clearly understood by those of ordinary skill in the art to which the present invention pertains from the description below.

Technical Solution

A preferred embodiment of the present invention provides a filter structure having a function of selectively collecting water through opposite ends thereof, which includes a housing of which at least one side end is open and a separation membrane module which is disposed in the housing with at least one filtering sheet wound around an outer surface of a water passage pipe having at least one inlet hole formed therein to filter a raw water passing through the inside of the separation membrane module into a clean water and a concentrate, the filter structure including: a first sealing portion which has a first entry/exit selectively opened or closed by a first opening/closing valve and a second entry/exit selectively opened or closed by a second opening/closing valve and is configured to seal one end of the housing; a second sealing portion which has an outlet connected to communicate with an open end on one side of the water passage pipe, has a third entry/exit selectively opened or closed by a third opening/closing valve and a fourth entry/exit selectively opened or closed by a fourth opening/closing valve, and is configured to seal the other end of the housing; and a controller which is configured to control opening/closing operations of the first and second opening/closing valves, control opening/closing operations of the third and fourth opening/closing valves, and, in order to form a forward fluid flow from the first sealing portion to the second sealing portion or form a reverse fluid flow from the second sealing portion to the first sealing portion, control the supply of the raw water through any one of the first entry/exit and the second entry/exit or control the supply of the raw water through any one of the third entry/exit and the fourth entry/exit.

Preferably, the controller may perform control by repeating a forward filtering mode, in which the raw water introduced through a selectively opened entry/exit among the first entry/exit and the second entry/exit of the first sealing portion is filtered while forming the forward fluid flow from the first sealing portion to the second sealing portion, the concentrate is discharged to the outside through a selectively opened entry/exit among the third entry/exit and the fourth entry/exit of the second sealing portion, and the clean water is discharged to the outside through the outlet, and a reverse filtering mode, in which the raw water introduced through a selectively opened entry/exit among the third entry/exit and the fourth entry/exit of the second sealing portion is filtered while forming the reverse fluid flow from the second sealing portion to the first sealing portion, the concentrate is discharged to the outside through a selectively opened entry/exit among the first entry/exit and the second entry/exit of the first sealing portion, and the clean water is discharged to the outside through the outlet, one or more times at predetermined intervals.

Preferably, the controller may be electrically connected to a timer configured to generate an operation signal according to a preset time and may, using the operation signal of the timer, control the opening/closing operations of the first and second opening/closing valves to selectively open one of the first entry/exit and the second entry/exit and control the opening/closing operations of the third and fourth opening/closing valves to selectively open one of the third entry/exit and the fourth entry/exit.

Preferably, the controller may be electrically connected to a flowmeter configured to measure a discharge amount of the clean water discharged to the outside through the outlet in real time and may, using an operation signal based on a change value of the discharge amount of the clean water that is measured by the flowmeter, control the opening/closing operations of the first and second opening/closing valves to selectively open one of the first entry/exit and the second entry/exit and control the opening/closing operations of the third and fourth opening/closing valves to selectively open one of the third entry/exit and the fourth entry/exit.

Preferably, the controller may control a mode of a filtering operation to be switched between the forward filtering mode and the reverse filtering mode at an interval in a range of 4 hours to 12 hours.

Preferably, the filter structure may include a sealing portion configured to separate the raw water supplied to pass through the separation membrane module and the concentrate discharged from the separation membrane module to prevent the raw water and the concentrate from being mixed with each other, and the sealing portion may include a first blocking seal which is disposed at an outer surface of one side end of the separation membrane module, which corresponds to the first sealing portion, and has an outer side end coming in contact with an inner surface of the housing and a second blocking seal which is disposed at an outer surface of the other side end of the separation membrane module, which corresponds to the second sealing portion, and has an outer side end coming in contact with the inner surface of the housing.

A preferred embodiment of the present invention provides a filtering method using a filter structure having a function of selectively collecting water through opposite ends thereof, which is a method using a filter structure including a housing of which at least one side end is open and a separation membrane module which is disposed in the housing with at least one filtering sheet wound around an outer surface of a water passage pipe having at least one inlet hole formed therein to filter a raw water passing through the inside of the separation membrane module into a clean water and a concentrate, the filtering method including, while using the filter structure which includes a first sealing portion which has a first entry/exit selectively opened or closed by a first opening/closing valve and a second entry/exit selectively opened or closed by a second opening/closing valve and is configured to seal one end of the housing, a second sealing portion which has an outlet connected to communicate with an open end on one side of the water passage pipe, has a third entry/exit selectively opened or closed by a third opening/closing valve and a fourth entry/exit selectively opened or closed by a fourth opening/closing valve, and is configured to seal the other end of the housing, and a controller which is configured to control opening/closing operations of the first and second opening/closing valves and control opening/closing operations of the third and fourth opening/closing valves: a forward filtering mode operation in which the raw water introduced through a selectively opened entry/exit among the first entry/exit and the second entry/exit of the first sealing portion is filtered while forming a forward fluid flow from the first sealing portion to the second sealing portion and passing through the separation membrane module by the controller, the concentrate is discharged to the outside through a selectively opened entry/exit among the third entry/exit and the fourth entry/exit of the second sealing portion by the controller, and the clean water is discharged to the outside through the outlet; and a reverse filtering mode operation in which the raw water introduced through a selectively opened entry/exit among the third entry/exit and the fourth entry/exit of the second sealing portion is filtered while forming a reverse fluid flow from the second sealing portion to the first sealing portion and passing through the separation membrane module by the controller, the concentrate is discharged to the outside through a selectively opened entry/exit among the first entry/exit and the second entry/exit of the first sealing portion by the controller, and the clean water is discharged to the outside through the outlet, wherein, by the controller, the forward filtering mode operation and the reverse filtering mode operation are repeatedly performed one or more times at predetermined intervals.

Preferably, switching between the forward filtering mode operation and the reverse filtering mode operation may be performed using an operation signal of a timer configured to generate an operation signal according to a preset time.

Preferably, switching between the forward filtering mode operation and the reverse filtering mode operation may be performed using an operation signal based on a change value of a discharge amount of clean water that is measured by a flowmeter configured to measure the discharge amount of the clean water discharged to the outside through the outlet in real time.

Preferably, switching between the forward filtering mode operation and the reverse filtering mode operation may occur at an interval in a range of 4 hours to 12 hours.

Advantageous Effects

According to preferred embodiments of the present invention, there are the following advantageous effects.

A direction of an inflow of a raw water which is filtered while passing through a separation membrane module disposed in a filter structure is periodically switched in opposite directions, instead of being maintained in one direction, by the switching control between a forward filtering mode and a reverse filtering mode of a controller. In this way, since contamination of the separation membrane module, which starts from and intensively occurs in a concentrate discharge direction, can be distributed in opposite directions, a filtration area of the separation membrane module can be uniformly used throughout, and since contamination which is accelerated after the contamination of the separation membrane module occurs can be delayed, the service life of the filter structure can be extended.

DESCRIPTION OF DRAWINGS

FIG. 7 illustrates contamination states of separation membrane modules disassembled after the filtering operation, wherein FIG. 7A illustrates a separation membrane module of Comparative Example, and FIG. 7B illustrates a separation membrane module of Example 4.

MODES OF THE INVENTION

Figure 1:
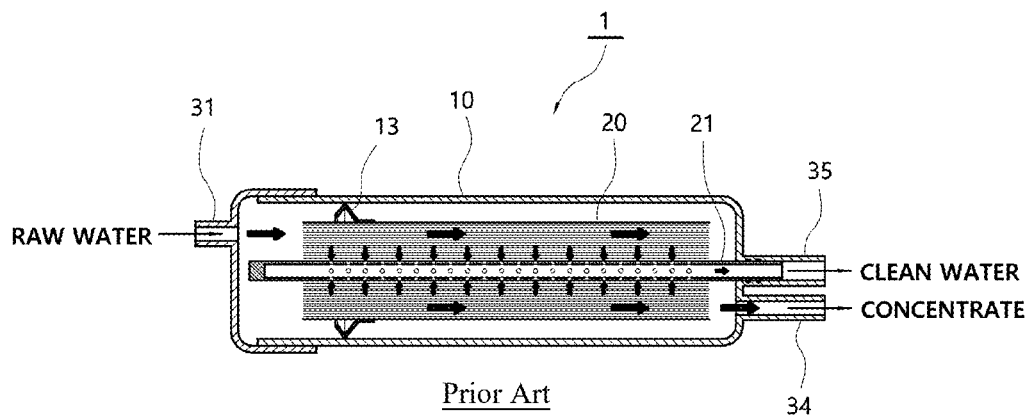
FIG. 1 is a cross-sectional view illustrating a typical filter structure.

Hereinafter, preferred embodiments according to the present invention will be described in detail with reference to the accompanying drawings to allow those of ordinary skill in the art to which the present invention pertains to easily embody the present invention. However, in describing a structural principle related to the preferred embodiments of the present invention in detail, when detailed description of a related known function or configuration is deemed as having the possibility of unnecessarily obscuring the gist of the present invention, the detailed description thereof will be omitted.

Also, the same reference numerals will be used throughout the drawings and the description to refer to the same or like parts.

In addition, throughout the specification, when a certain part is described as being "connected" to another part, this not only includes a case where the two parts are "directly connected," but also includes a case where the two parts are "indirectly connected" while another element is disposed therebetween. Also, unless otherwise stated, "including" a certain component indicates that another component may be further included instead of excluding other components.

Figure 2:
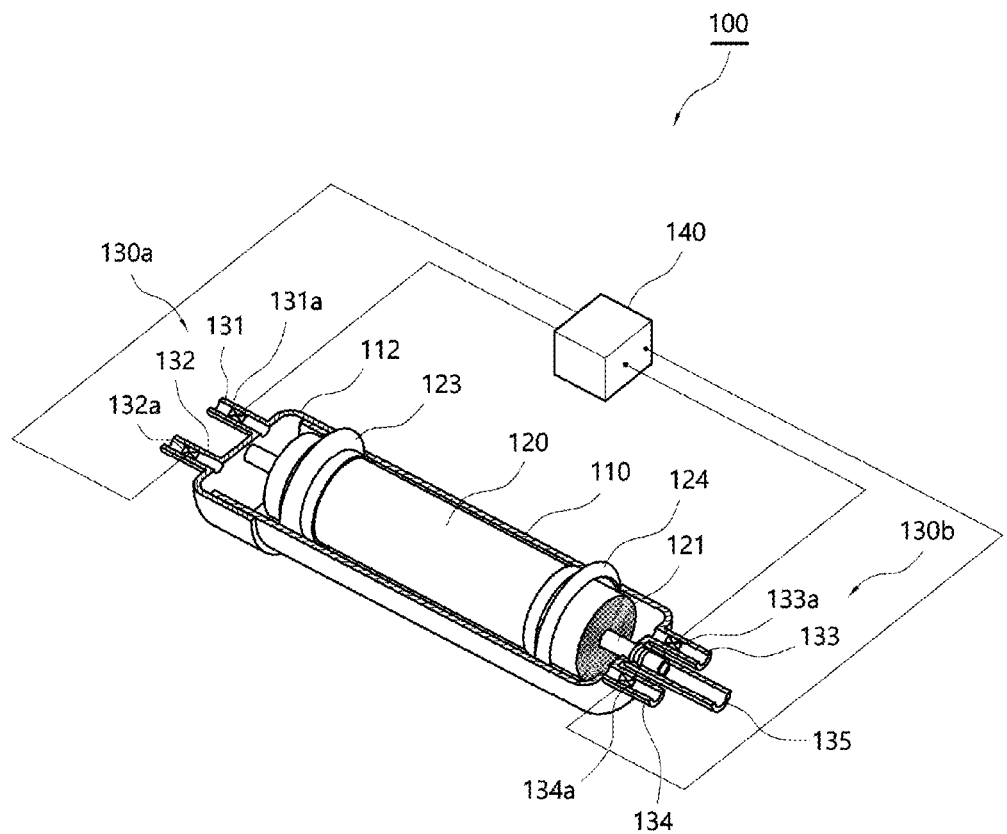
FIG. 2 is a cross-sectional perspective view illustrating a filter structure having a function of selectively collecting water through opposite ends thereof according to an embodiment of the present invention.
Figure 3:
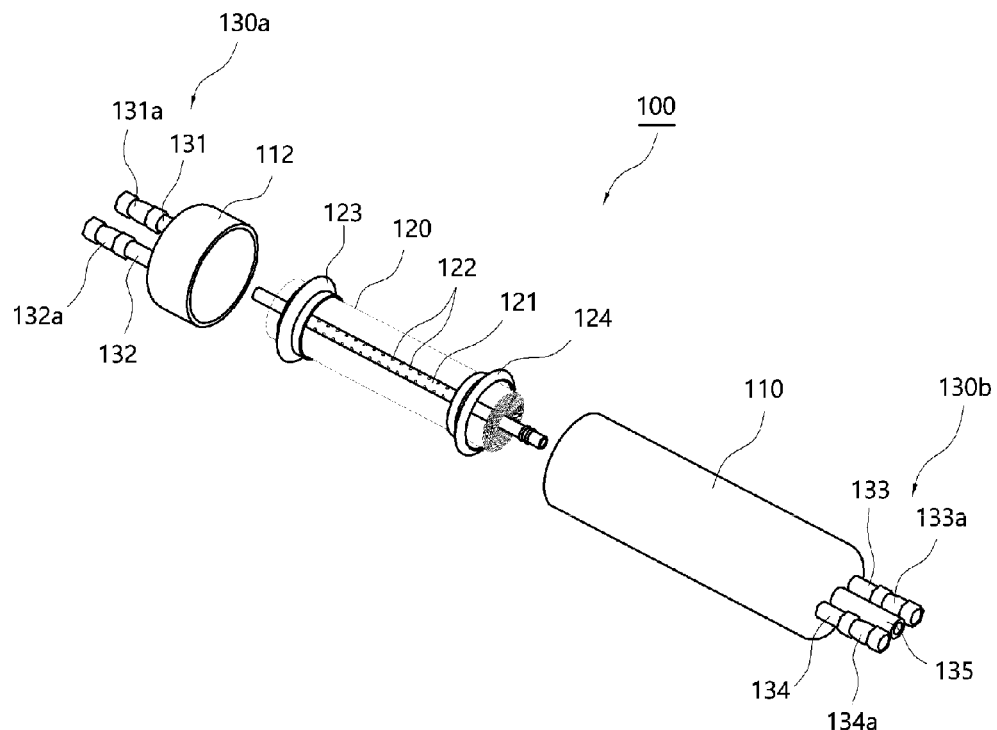
FIG. 3 is an exploded perspective view illustrating the filter structure having a function of selectively collecting water through opposite ends thereof according to an embodiment of the present invention.

As illustrated in FIGS. 2 and 3, a filter structure 100 having a function of selectively collecting water through opposite ends thereof according to an embodiment of the present invention includes a housing 110, a separation membrane module 120, first and second sealing portions 130a and 130b, and a controller 140.

The housing 110 is a hollow cylindrical member of which at least one end is open and which is disposed in an inner space of the separation membrane module 120.

The housing 110 is illustrated and described as being made of a hollow cylindrical member whose one end corresponding to the first sealing portion 130b is open, but the housing 110 is not limited thereto and may be made of a hollow cylindrical member of which the other end corresponding to the second sealing portion is open or of which opposite ends corresponding to the first and second sealing portions are open.

For a water passage pipe 121 of a certain length, in which at least one inlet hole 122 is formed to pass through an outer surface, to be disposed at the center of its body, the separation membrane module 120 is disposed in the housing 110 with at least one filtering sheet, of which one end is fixed, wound in the form of a roll around the outer surface of the water passage pipe.

The water passage pipe 121 may be made of a hollow pipe member of a certain length of which any one of both ends is open or both ends are open and in which, at an intermediate portion of the length, at least one inlet hole 122 is formed to allow the introduction of a clean water, which is a produced water.

The filtering sheet wound in the form of a roll around the water passage pipe to form the separation membrane module may be made of a membrane sheet and a permeable water flow path sheet.

Here, the membrane sheet may be one or more selected from a polyamide-based separation membrane, a polyimide-based separation membrane, a polysulfone-based separation membrane, and a polyether sulfone-based separation membrane. Preferably, the membrane sheet may be a polyamide-based separation membrane.

The permeable water flow path sheet may be a made of a tricot fabric in which fibers are combined in the form of felt, paper, a nonwoven fabric, etc. or fibers are woven with warp and weft yarns.

The filtering sheet made of the membrane sheet and the permeable water flow path sheet is wound in the form of a roll around the outer surface of the water passage pipe in a state in which the filtering sheet is stacked in multiple layers by being stacked and bonded via a bonding line applied so that one side corresponding to the water passage pipe is open.

The first sealing portion 130a includes a first entry/exit 131 selectively opened or closed by a first opening/closing valve 131a and a second entry/exit 132 selectively opened or closed by a second opening/closing valve 132a and seals the open one side end of the housing 110.

The first entry/exit 131 and the second entry/exit 132 are each illustrated and described as being provided as a hollow tube member that extends a certain length outward from an end surface of a sealing cap 112 which is inserted into the open one end of the housing to correspond thereto, but the first entry/exit 131 and the second entry/exit 132 are not limited thereto and may each be provided as a hollow tube member that extends a predetermined length outward from a sealed end surface at one end of the housing 110.

Also, the first and second opening/closing valves configured to selectively open or close internal passages of the first entry/exit 131 and the second entry/exit 132 may be provided as manual valve members that are manually opened or closed or may be provided as electronic valve members that are opened or closed by an electrical signal of the controller 140 which will be described below.

Like the first sealing portion, the second sealing portion 130b includes a third entry/exit 133 selectively opened or closed by a third opening/closing valve 133a and a fourth entry/exit 134 selectively opened or closed by a fourth opening/closing valve 134a and seals the other side end of the housing 110 that is open.

The third entry/exit 133 and the fourth entry/exit 134 are each illustrated and described as being provided as a hollow tube member that extends a certain length outward from a sealed end surface at the open other end of the housing 110, but the third entry/exit 133 and the fourth entry/exit 134 are not limited thereto and may each be provided as a hollow tube member that extends a predetermined length outward from an end surface of a sealing cap which is inserted into the open other end of the housing to correspond thereto.

Also, like the first sealing portion, the third and fourth opening/closing valves configured to selectively open or close internal passages of the third entry/exit 133 and the fourth entry/exit 134 may be provided as manual valve members that are manually opened or closed or may be provided as electronic valve members that are opened or closed by an electrical signal of the controller 140 which will be described below.

The second sealing portion 130b may include an outlet 135 which is connected to communicate with an open end on one side of the water passage pipe 121 and through which a clean water, which is a filtered produced water of the raw water passing through the separation membrane module 120, is discharged to the outside.

The controller 140 controls opening/closing operations of the first and second opening/closing valves 131a and 132a disposed at the first sealing portion 130a and controls opening/closing operations of the third and fourth opening/closing valves 133a and 134a disposed at the second sealing portion 130b to perform operation control of a filtering process so that a forward filtering mode, which forms a forward fluid flow in which the raw water advances from the first sealing portion 130a to the second sealing portion 130b, and a reverse filtering mode, which forms a reverse fluid flow in which the raw water advances from the second sealing portion 130b to the first sealing portion 130a, are repeatedly performed one or more times at predetermined intervals.

The controller 140 may be electrically connected to a timer configured to generate an operation signal according to a preset time and may, using the operation signal of the timer, control the opening/closing operations of the first and second opening/closing valves 131a and 132a disposed at the first sealing portion 130a to selectively open any one of the first entry/exit and the second entry/exit and control the opening/closing operations of the third and fourth opening/closing valves 133a and 134a disposed at the second sealing portion 130b to selectively open any one of the third entry/exit 133 and the fourth entry/exit 134.

Also, the controller 140 may be electrically connected to a flowmeter configured to measure a discharge amount of the clean water discharged to the outside through the outlet 135 in real time and may, using an operation signal based on a change value of the discharge amount of the clean water that is measured by the flowmeter, control the opening/closing operations of the first and second opening/closing valves 131a and 132a disposed at the first sealing portion 130a to selectively open any one of the first entry/exit 131 and the second entry/exit 132 and control the opening/closing operations of the third and fourth opening/closing valves 133a and 134a disposed at the second sealing portion to selectively open any one of the third entry/exit 133 and the fourth entry/exit 134.

Meanwhile, the filter structure 100 may include a sealing portion which is disposed between the housing 110 and the separation membrane module 120 and configured to separate the raw water supplied to pass through the separation membrane module and the concentrate discharged from the separation membrane module 120 to prevent the raw water and the concentrate from being mixed with each other.

The sealing portion may include a first blocking seal 123 which is disposed at an outer surface of one side end of the separation membrane module, which corresponds to the first sealing portion 130a, and has an outer side end coming in contact with an inner surface of the housing and a second blocking seal 124 which is disposed at an outer surface of the other side end of the separation membrane module 120, which corresponds to the second sealing portion 130b, and has an outer side end coming in contact with the inner surface of the housing 110.

The separation membrane module 120 installed in the housing may be sealed in opposite directions, instead of being sealed in one direction, by the first and second blocking seals 123 and 124 disposed at the outer portions of opposite ends of the separation membrane module to collect water through the opposite ends. In this way, preferably, the raw water may be prevented from being introduced through the concentrate side regardless of a direction in which the raw water is introduced.

That is, when the raw water is introduced through the concentrate side, problems such as a decrease in the amount of permeated water and a drop in a salt rejection rate may occur due to the loss of an operation pressure. Thus, the sealing portion may be disposed to enable sealing in opposite directions by the first and second blocking seals respectively attached to opposite side ends of the separation membrane module or by a single seal, such as a quad ring, disposed at the separation membrane module.

Figure 4:
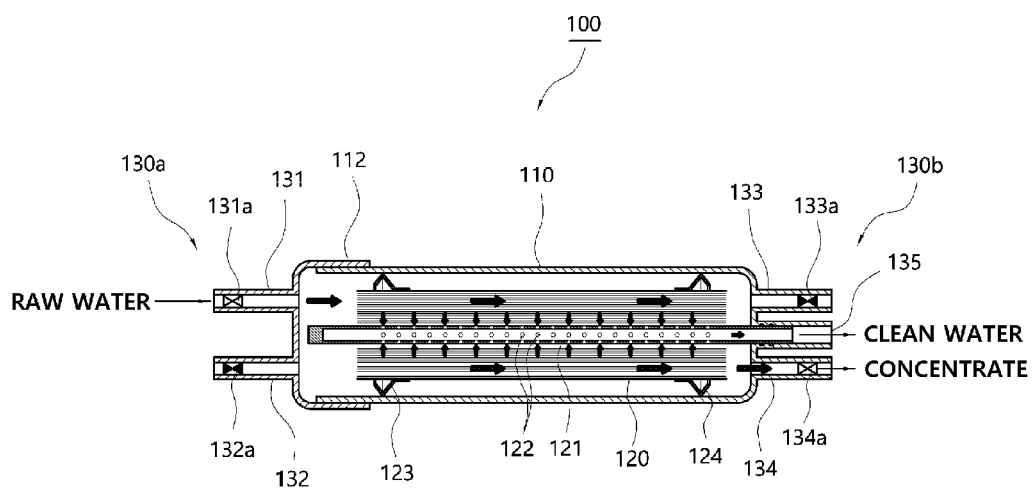
FIG. 4 is a cross-sectional view illustrating a filtering process when a raw water is introduced in a forward direction into the filter structure having a function of selectively collecting water through opposite ends thereof according to an embodiment of the present invention.

As illustrated in FIG. 4, the forward filtering mode performed by the controller 140 is performed in a state in which the first opening/closing valve 131a is opened while the second opening/closing valve 132a is closed among the first and second opening/closing valves of the first sealing portion 130a, and the third opening/closing valve 133a is closed while the fourth opening/closing valve 134a is opened among the third and fourth opening/closing valves of the second sealing portion 130b.

In this state, when a raw water is supplied and forcibly introduced through the first entry/exit 131 opened by the first opening/closing valve, the raw water is filtered while forming a forward fluid flow from one end of the separation membrane module 120 that corresponds to the first sealing portion to the other end of the separation membrane module 120 that corresponds to the second sealing portion, and thus the concentrate of the raw water filtered while passing through the filtering sheet of the separation membrane module 120 in a forward direction is discharged to the outside through the fourth entry/exit 134 that is open by the fourth opening/closing valve, and the clean water, which is a produced water, is introduced into the inlet hole 122 of the water passage pipe 121 and discharged to the outside through the outlet 135 connected to communicate with the water passage pipe.

Here, when the clean water, which is the produced water, is produced for a certain amount of time by the operation in the forward filtering mode that forms a forward fluid flow of the raw water, the level of contamination of the separation membrane module is biased toward the concentrate discharge side, which is one side. Thus, on the basis of a set time of a timer that is preset or a value measured by a flowmeter configured to measure a discharge amount of clean water discharged through the outlet, an operation in the reverse filtering mode that changes a direction of an inflow of the raw water, which is introduced into the separation membrane module, to a reverse direction is repeatedly performed one or more times.

Figure 5:
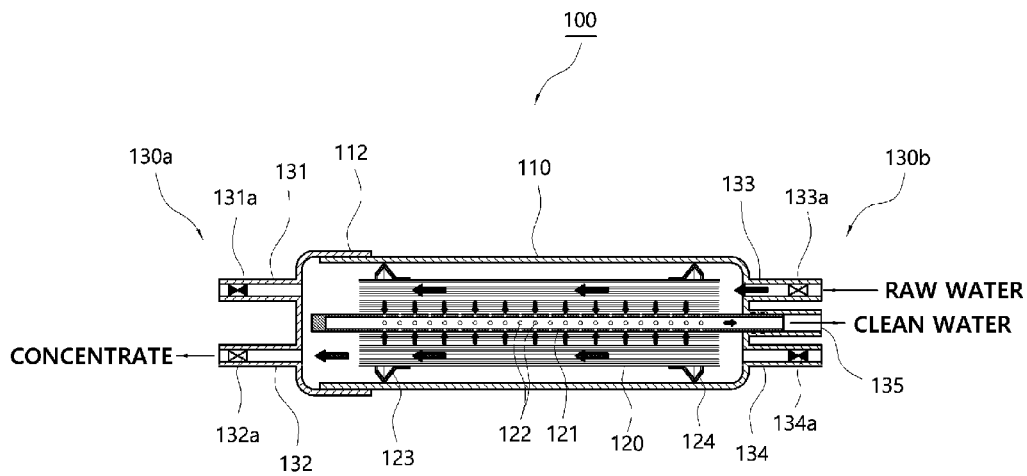
FIG. 5 is a cross-sectional view illustrating a filtering process when a raw water is introduced in a reverse direction into the filter structure having a function of selectively collecting water through opposite ends thereof according to an embodiment of the present invention.

As illustrated in FIG. 5, the reverse filtering mode performed by the controller 140 is performed in a state in which, due to a control signal of the controller, the open first opening/closing valve 131a is switched to a closed state while the closed second opening/closing valve 132a is switched to an open state among the first and second opening/closing valves of the first sealing portion 130a, and the closed third opening/closing valve 133a is switched to an open state while the open fourth opening/closing valve 134a is switched to a closed state among the third and fourth opening/closing valves of the second sealing portion.

In this state, when the raw water is supplied and introduced through the third entry/exit 133 opened by the third opening/closing valve, the raw water is filtered while forming a reverse fluid flow from the other end of the separation membrane module 120 that corresponds to the second sealing portion 130b to the one end of the separation membrane module that corresponds to the first sealing portion 130a, and thus the concentrate of the raw water filtered while passing through the separation membrane module in a reverse direction is discharged to the outside through the second entry/exit that is opened by the second opening/closing valve, and the clean water, which is the produced water, is introduced into the inlet hole of the water passage pipe and discharged to the outside through the outlet connected to communicate with the water passage pipe.

Accordingly, a direction of an inflow of the raw water which is filtered while passing through the separation membrane module, which is the key component disposed in the filter structure, is switched in opposite directions, instead of being maintained in one direction, by the switching control between the forward filtering mode and the reverse filtering mode of the controller. In this way, contamination of the separation membrane module, which starts from and intensively occurs in the concentrate discharge direction, may be distributed in opposite directions so that a filtration area of the separation membrane module is uniformly used throughout, and an effect of delaying contamination which is accelerated after the contamination of the separation membrane module occurs may be achieved, making it possible to extend the service life of the filter structure.

Meanwhile, filtering of the raw water using the separation membrane module of the filter structure may vary according to the actual filtering operation time, which a water purifier usage time, the amount of water passing, or the permeability of the separation membrane module itself, but preferably, a filtering operation may be performed while a direction of an inflow of the raw water is changed at an interval in a range of 4 hours to 12 hours, and in this way, the contamination of the separation membrane module may be delayed to extend the service life of the filter structure.

Here, when the interval at which the direction of the inflow of the raw water is changed is shorter than 4 hours or longer than 12 hours, the effect of switching the direction of the inflow of the raw water in opposite directions may be decreased, causing the effect of delaying the contamination of the separation membrane module to be degraded.

That is, the filter structure 100 according to a preferred embodiment of the present invention changes a structure and performs control so that a direction of an inflow of the raw water is switched in opposite directions instead of being maintained in one direction, and in this way, an effect of delaying the contamination occurring in the separation membrane module and extending the service life of the filter structure is outstanding. Here, the service life of the filter structure may be relatively compared using an extent to which the water permeability is degraded due to contamination over the operation time and may be compared by disassembling used separation membrane modules from housings and then checking a degree of contamination of surfaces thereof by visual inspection.

Example 1

The first and second blocking seals 123 and 124 were respectively attached to opposite sides of an outer surface of a household separation membrane module 120, which is a 1812 industrial separation membrane, and then the separation membrane module 120 was mounted on a bezel of a tester, and for contamination to easily occur during filtering in the separation membrane module, a prepared water containing 250 ppm calcium chloride, 160 ppm sodium hydrogen carbonate, and 90 ppm sodium chloride as scale components, which are foreign substances, was used as a raw water, and operation was performed with a pressure of 80 psi, a temperature of 25° C., and a recovery rate in a range of 60% to 65%. Here, a filtering mode was switched at an interval of 1 hour between a forward filtering mode for introducing the raw water in a forward direction and a reverse filtering mode for introducing the raw water in a reverse direction, the amount of permeated water was measured over the operation time, and the result is shown in Table 1.

Example 2

An evaluation was performed in the same way as in Example 1 except that the filtering mode was switched between the forward filtering mode and the reverse filtering mode at an interval of 2 hours.

Example 3

An evaluation was performed in the same way as in Example 1 except that the filtering mode for introducing the raw water was switched between the forward filtering mode and the reverse filtering mode at an interval of 4 hours.

Example 4

An evaluation was performed in the same way as in Example 1 except that the filtering mode for introducing the raw water was switched between the forward filtering mode and the reverse filtering mode at an interval of 8 hours.

Example 5

An evaluation was performed in the same way as in Example 1 except that the filtering mode for introducing the raw water was switched between the forward filtering mode and the reverse filtering mode at an interval of 12 hours.

Example 6

An evaluation was performed in the same way as in Example 1 except that the filtering mode for introducing the raw water was switched between the forward filtering mode and the reverse filtering mode at an interval of 14 hours.

Comparative Example 1

An evaluation was performed in the same way as in Example 1 except that the operation was performed in one direction as in a typical water purifier system in the forward filtering mode without changing the direction for introducing the raw water.

TABLE 1

| | Time (min) | 30 | 60 | 120 | 240 | 500 | 1030 | 1470 | 1950 | 2430 | 2970 |
|---|---|---|---|---|---|---|---|---|---|---|---|
| Flow rate of produced water (GPD) | Comparative Example 1 | 103.9 | 103.4 | 101.4 | 99.6 | 95.4 | 91.3 | 88.5 | 81.3 | 74.4 | 66.7 |
| | Example 1 | 97.5 | 97.5 | 97.5 | 97.5 | 97.5 | 97.5 | 85.2 | 78.8 | 71.3 | 64.5 |
| | Example 2 | 97.1 | 97.1 | 97.1 | 97.1 | 97.1 | 97.1 | 83.6 | 77.8 | 72.5 | 64.3 |
| | Example 3 | 94.2 | 94.2 | 94.2 | 94.2 | 94.2 | 94.2 | 80.9 | 75.6 | 71.8 | 66.4 |
| | Example 4 | 96.7 | 96.7 | 96.7 | 96.7 | 96.7 | 96.7 | 86.5 | 80.4 | 76.4 | 72.4 |
| | Example 5 | 101.1 | 101.1 | 101.1 | 101.1 | 101.1 | 101.1 | 90.1 | 83.4 | 79.7 | 75.5 |

Figure 6:
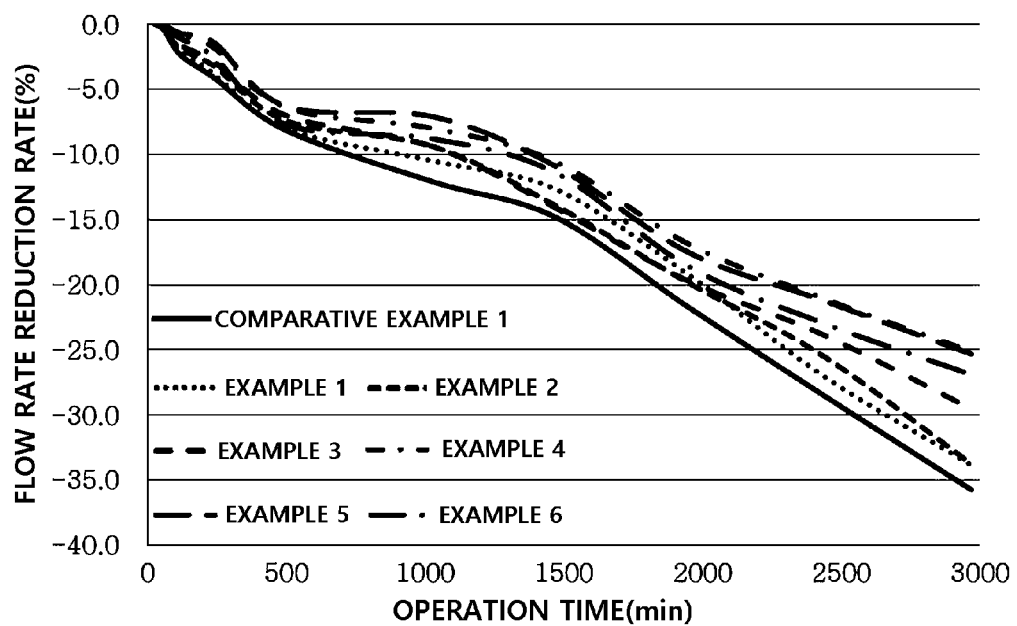
FIG. 6 is a graph illustrating the correlation between a flow rate of produced water and a filtering operation time.

As shown in Table 1 above and FIG. 6, it can be seen that, as compared to Comparative Example 1 in which the raw water was introduced only in one direction in the forward filtering mode, a flow rate relatively reduced less after a filtering operation of about 3,000 minutes in the cases of Example 1 to Example 6.

In particular, the effects vary according to an interval at which the filtering mode is switched between the forward filtering mode and the reverse filtering mode to change the direction of an inflow of the raw water. It can be seen that a flow rate reduction rate is even lower when the switching is performed at an interval of 4 hours or more.

This is a result of changing the direction of an inflow of the raw water from the forward direction to the reverse direction, which mitigates membrane contamination which occurs from a concentrate discharge side due to the concentrate being biased toward only one side of the separation membrane module. The service life of the separation membrane filter structure may be extended as much as the flow rate reduction rate is lower, and thus an effect of delaying the replacement time of the filter structure may be obtained.

It can be seen that, while the flow rate of the produced water reduced by about 36% after the filtering operation of about 3,000 minutes in Comparative Example 1, the flow rate of the produced water reduced by about 25% after the same amount of operation time in Example 4, and a difference in the flow rate reduction rate between Comparative Example 1 and Example 4 was about 10%.

Also, in the case of Example 6 in which the filtering mode was switched at an interval of 14 hours, the effects were relatively greater as compared to the comparative example, but were slightly less as compared to Example 5. From this, it can be seen that a proper switching interval according to the performance of the separation membrane module itself and the operation conditions is important.

Figure 7:
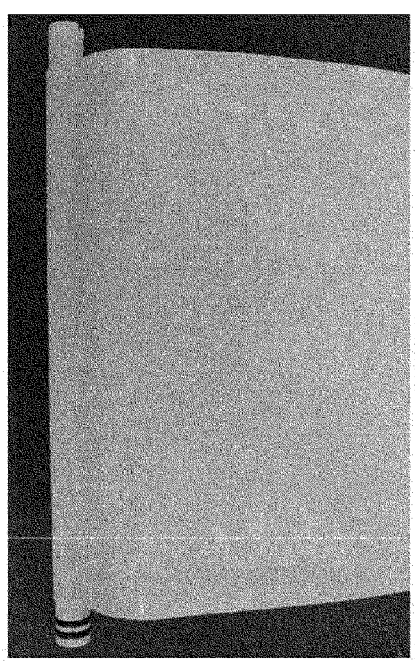
Figure 7:
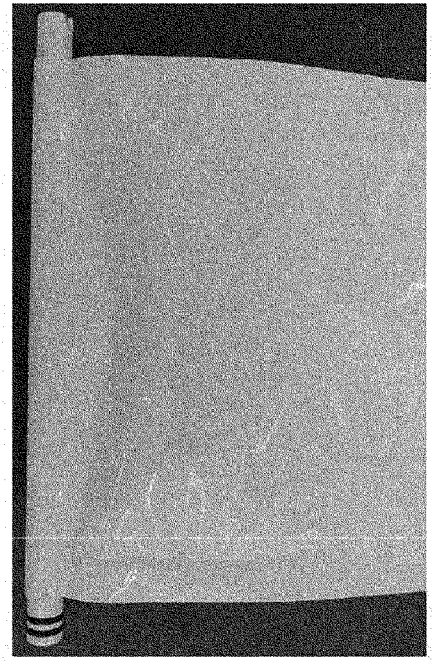

Also, as illustrated in FIGS. 7A and 7B, after the performance evaluation, separation membrane modules were disassembled from housings to compare a degree of contamination of surfaces of filtering sheets thereof, which are relative separation membranes.

In FIG. 7A which represents Comparative Example 1, it can be seen that contaminants are accumulated in a direction of a concentrate. On the other hand, in FIG. 7B which represents Example 4 in which the flow rate reduction rate is the lowest, it can be seen that accumulation of contaminants on the surface is hardly seen by visual inspection.

This is a result that shows the same trend as the difference in the flow rate reduction rate according to the degree of contamination and proves the effect of reducing the contamination of the separation membrane module by switching a filtering mode between the forward filtering mode and the reverse filtering mode.

In the above examples, in order to allow the effects of switching a filtering mode between the forward filtering mode and the reverse filtering mode to be checked within a short time, the evaluation was performed using the raw water in which scale components were mixed in large amounts to accelerate the contamination of the separation membrane module. Accordingly, when a tap water is used as a raw water as when using a typical water purifier system and a pretreatment filter is used, the service life extension effect by reducing the contamination of the separation membrane module may be maximized.

In a water purifier system to which the filter structure of the present invention is applied, when a direction of an inflow of the raw water is periodically switched at a certain interval, the contamination of the separation membrane module, which is the key component, may be reduced, and thus the service life of the filter structure may be extended, and the filter structure may be usefully used as the filter structure for the water purifier system.

The present invention described above is not limited by the embodiments described herein and the accompanying drawings, and it should be apparent to those of ordinary skill in the art to which the present invention pertains that various substitutions, modifications, and alterations are possible within the scope not departing from the technical spirit of the present invention.

The invention claimed is:

1. A filter structure having a function of selectively collecting water through opposite ends thereof, which includes a housing of which at least one side end is open and a separation membrane module which is disposed in the housing with at least one filtering sheet wound around an outer surface of a water passage pipe having at least one inlet hole formed therein to filter a raw water passing through the inside of the separation membrane module into a clean water and a concentrate, the filter structure comprising:
a first sealing portion which has a first entry/exit selectively opened or closed by a first opening/closing valve and a second entry/exit selectively opened or closed by a second opening/closing valve and is configured to seal one end of the housing;
a second sealing portion which has an outlet connected to communicate with an open end on one side of the water passage pipe, has a third entry/exit selectively opened or closed by a third opening/closing valve and a fourth entry/exit selectively opened or closed by a fourth opening/closing valve, and is configured to seal the other end of the housing; and
a controller which is configured to control opening/closing operations of the first and second opening/closing valves, control opening/closing operations of the third and fourth opening/closing valves, and, in order to form a forward fluid flow from the first sealing portion to the second sealing portion or form a reverse fluid flow from the second sealing portion to the first sealing portion, control the supply of the raw water through any one of the first entry/exit and the second entry/exit or control the supply of the raw water through any one of the third entry/exit and the fourth entry/exit; wherein
the outlet is connected in communication with an open end of a water passage pipe whose end corresponding to the first sealing portion is sealed,
wherein the controller is electrically connected to a flowmeter configured to measure a discharge amount of the clean water discharged to the outside through the outlet in real time and, using an operation signal based on a change value of the discharge amount of the clean water that is measured by the flowmeter, controls the opening/closing operations of the first and second opening/closing valves to selectively open one of the first entry/exit and the second entry/exit and controls the opening/closing operations of the third and fourth opening/closing valves to selectively open one of the third entry/exit and the fourth entry/exit,
further comprising a sealing portion configured to separate the raw water supplied to pass through the separation membrane module and the concentrate discharged from the separation membrane module to prevent the raw water and the concentrate from being mixed with each other,
wherein the sealing portion includes a first blocking seal which is disposed at an outer surface of one side end of the separation membrane module, which corresponds to the first sealing portion, and has an outer side end coming in contact with an inner surface of the housing and a second blocking seal which is disposed at an outer surface of the other side end of the separation membrane module, which corresponds to the second sealing portion, and has an outer side end coming in contact with the inner surface of the housing.

2. The filter structure of claim 1, wherein the controller performs control by repeating a forward filtering mode, in which the raw water introduced through a selectively opened entry/exit among the first entry/exit and the second entry/exit of the first sealing portion is filtered while forming the forward fluid flow from the first sealing portion to the second sealing portion, the concentrate is discharged to the outside through a selectively opened entry/exit among the third entry/exit and the fourth entry/exit of the second sealing portion, and the clean water is discharged to the outside through the outlet, and a reverse filtering mode, in which the raw water introduced through a selectively opened entry/exit among the third entry/exit and the fourth entry/exit of the second sealing portion is filtered while forming the reverse fluid flow from the second sealing portion to the first sealing portion, the concentrate is discharged to the outside through a selectively opened entry/exit among the first entry/exit and the second entry/exit of the first sealing portion, and the clean water is discharged to the outside through the outlet, one or more times at predetermined intervals.

3. The filter structure of claim 1, wherein the controller is electrically connected to a timer configured to generate an operation signal according to a preset time and, using the operation signal of the timer, controls the opening/closing operations of the first and second opening/closing valves to selectively open one of the first entry/exit and the second entry/exit and controls the opening/closing operations of the third and fourth opening/closing valves to selectively open one of the third entry/exit and the fourth entry/exit.

4. A water purifier system comprising the filter structure of claim 1.

\* \* \* \* \*